United States Patent
Schlepple et al.

(10) Patent No.: US 12,493,150 B2
(45) Date of Patent: Dec. 9, 2025

(54) FIBER ARRAY UNIT FOR FLEXIBLE OPTICAL COUPLING

(71) Applicant: Cisco Technology, Inc., San Jose, CA (US)

(72) Inventors: Norbert Schlepple, Macungie, PA (US); Neda Noble, Dover, MA (US)

(73) Assignee: Cisco Technology, Inc., San Jose, CA (US)

( * ) Notice: Subject to any disclaimer, the term of this patent is extended or adjusted under 35 U.S.C. 154(b) by 316 days.

(21) Appl. No.: 18/168,230

(22) Filed: Feb. 13, 2023

(65) Prior Publication Data

US 2024/0272370 A1   Aug. 15, 2024

(51) Int. Cl.
   *G02B 6/30* (2006.01)
   *G02B 6/36* (2006.01)

(52) U.S. Cl.
   CPC ............. *G02B 6/30* (2013.01); *G02B 6/3636* (2013.01); *G02B 6/3652* (2013.01)

(58) Field of Classification Search
   CPC ...... G02B 6/3636; G02B 6/3652; G02B 6/30; G02B 6/3672; G02B 6/3664; G02B 6/08; G02B 6/04; G02B 6/06
   See application file for complete search history.

(56) References Cited

U.S. PATENT DOCUMENTS

| | | | | |
|---|---|---|---|---|
| 6,748,156 B2* | 6/2004 | Saito | .................... | G02B 6/3636 385/136 |
| 7,435,011 B2* | 10/2008 | Takeuchi | ............. | G02B 6/3652 385/83 |
| 7,829,697 B2* | 11/2010 | Bower | .................... | A23L 21/10 426/573 |
| 7,876,994 B2* | 1/2011 | Hiroi | .................... | G02B 6/3664 385/137 |
| 2003/0021573 A1 | 1/2003 | Matsumoto et al. | | |
| 2003/0095776 A1 | 5/2003 | Saito et al. | | |
| 2010/0111478 A1 | 5/2010 | Fujiyama | | |
| 2017/0205592 A1 | 7/2017 | Pfnuer | | |
| 2019/0285813 A1 | 9/2019 | Patel et al. | | |
| 2021/0088721 A1* | 3/2021 | Cai | ...................... | G02B 6/3664 |

FOREIGN PATENT DOCUMENTS

| JP | 09005576 A | * | 1/1997 | |
|---|---|---|---|---|
| WO | WO-2010053934 A2 | * | 5/2010 | ......... G02B 6/12019 |

OTHER PUBLICATIONS

Kihara et al., Machine Translation of JP-09005576-A, Jan. 10, 1997. (Year: 1997).*

* cited by examiner

*Primary Examiner* — Michelle R Connelly
(74) *Attorney, Agent, or Firm* — Patterson + Sheridan, LLP

(57) ABSTRACT

The fiber array units (FAUs) described herein include an FAU substrate with a coupling surface, an array of V-grooves formed in a FAU substrate, and a plurality of optical channels individually disposed in a respective V-groove of the array of V-grooves. The array of V-grooves and the optical channels are configured to position the optical channels along a curve defined in the coupling surface such that the optical channels are aligned with waveguides in a warped photonic device.

19 Claims, 5 Drawing Sheets

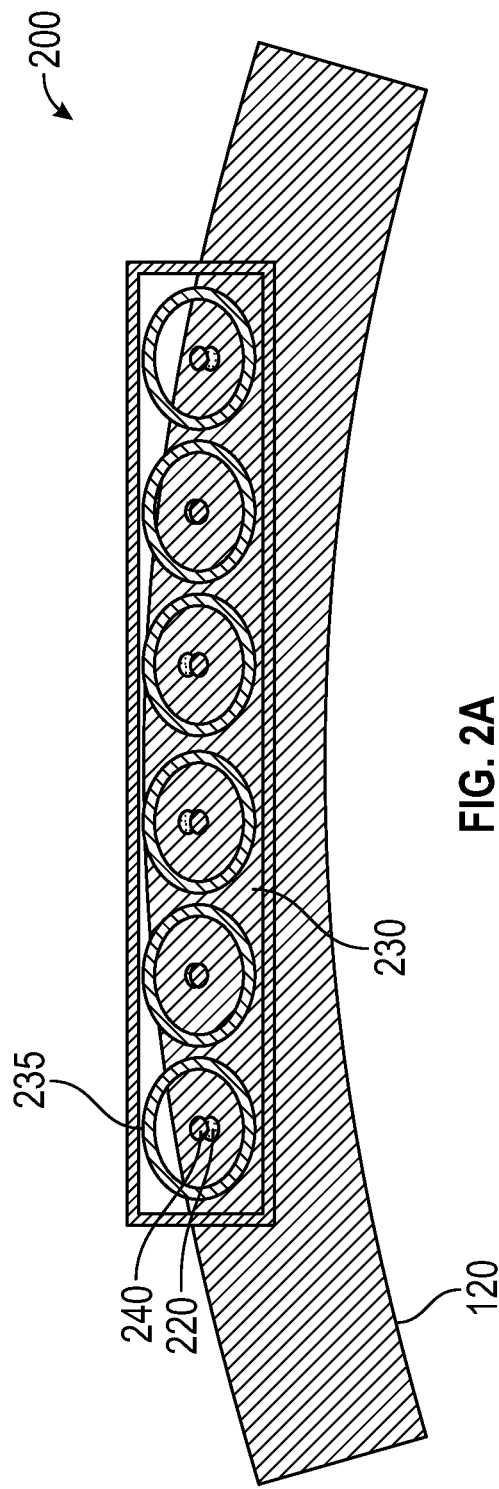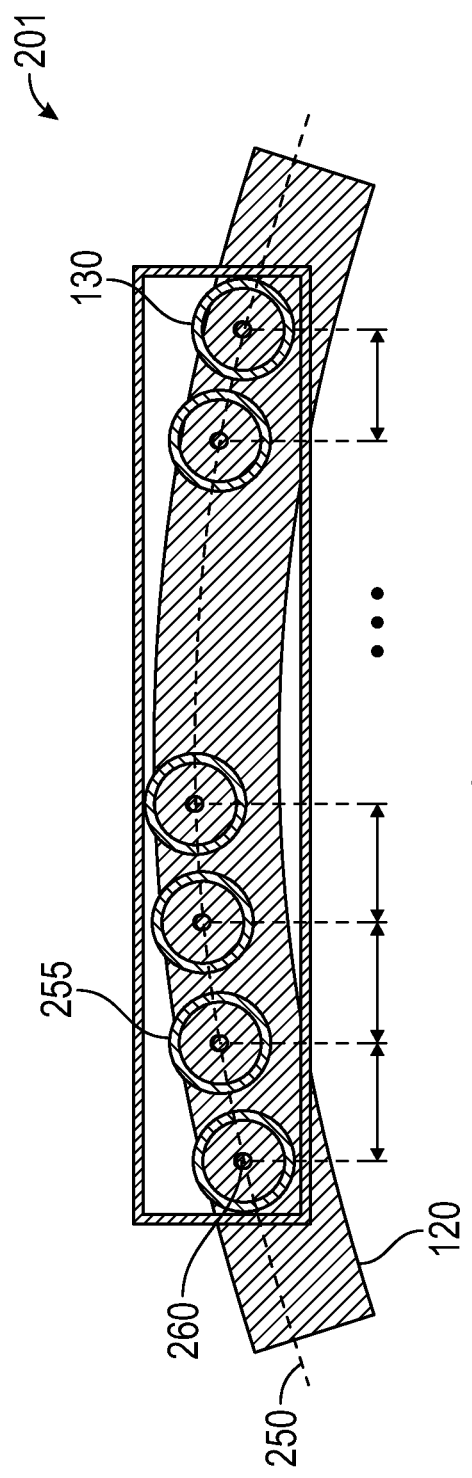

FIBER ARRAY UNIT FOR FLEXIBLE OPTICAL COUPLING

TECHNICAL FIELD

Embodiments presented in this disclosure generally relate to optical transceiver applications, and more specifically, to variable fiber array units (FAU) for optical transceiver applications to provide efficient coupling between optical fibers and photonic devices.

BACKGROUND

As optical communication networks increase in size and scope, increasing data traffic bandwidth requirements increase drive channel count and complexity embedded on single photonic integrated circuit (PIC), such as on optical engines for co-packaged optics (CPO). As a result, PIC footprints continue to increase together with optical fiber count aligned to the PIC edge in case of co-planar waveguide couplers. Additionally, the use of thru-silicon vias (TSV), further reduces PIC thickness down to ~0.1 millimeter (mm). The larger footprint and reduced thickness contribute to PIC packaging challenges due to PIC warpage, most notably for optical signal coupling. Additionally, various types and combination of fibers are being increasingly used to couple optical signals into a single PIC. Optical coupling in warped or non-linear PIC profiles and optical coupling for varied types of fibers remains a challenge.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting, other equally effective embodiments are contemplated.

FIGS. 2A and 2B provide cross-section views of a warped photonic device and FAU, according to one or more embodiments.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1A:
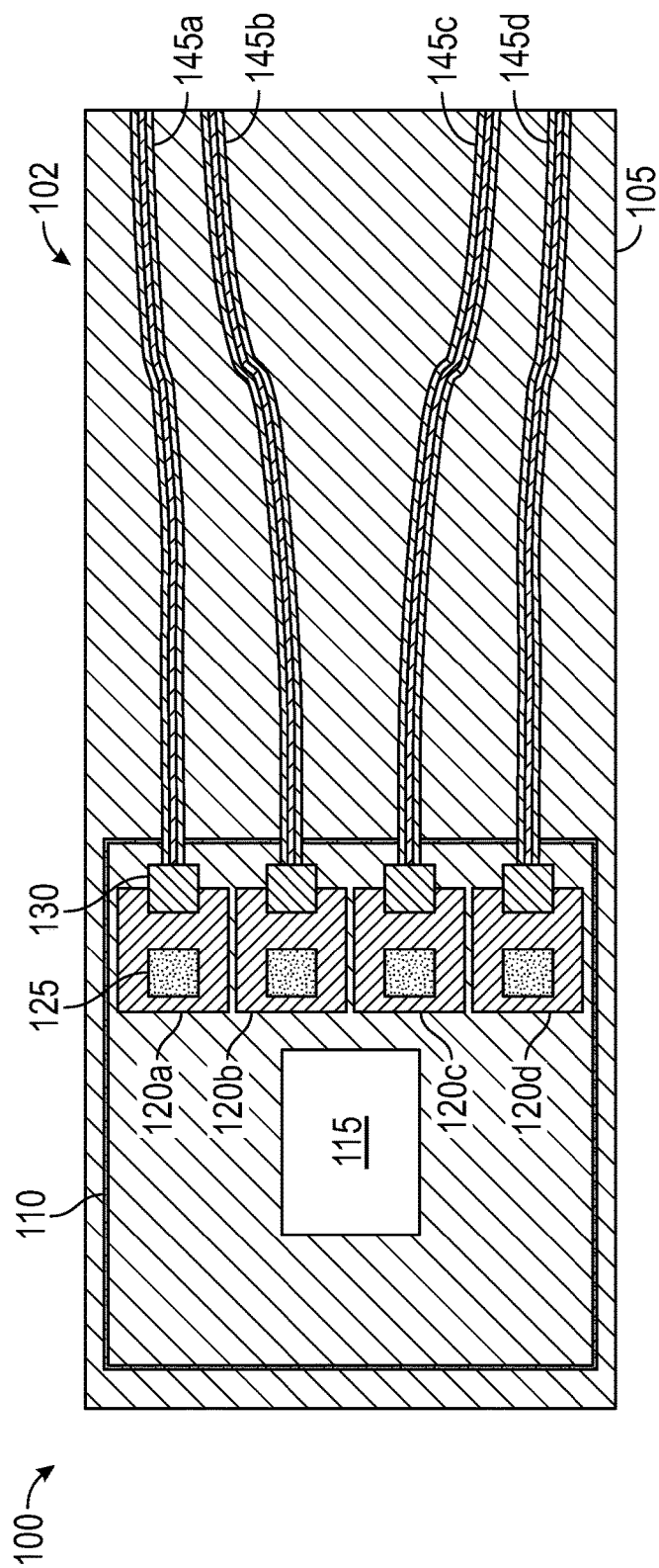
FIGS. 1A and 1B provide views of a network device with multiple photonic devices, according to one or more embodiments.

One general aspect includes a fiber array unit (FAU). The fiber array unit includes an FAU substrate with a coupling surface, an array of V-grooves formed in the FAU substrate, where each V-groove in the array of V-grooves may include: a bottom point of the V-groove at a varying depth. The unit also includes a plurality of optical channels individually disposed in a respective V-groove of the array of V-grooves and aligned along a curve defined in the coupling surface. The unit also includes a variable FAU lid disposed over the array of V-grooves and the plurality of optical channels.

One general aspect includes a fiber array unit (FAU). The fiber array unit also an FAU substrate with a coupling surface, an array of V-grooves formed in the FAU substrate, where each V-groove in the array of V-grooves may include: a varying V-groove width and a bottom point of the V-groove at a varying depth along a line defined in the coupling surface. The unit also includes a plurality of optical channels individually disposed in a respective V-groove of the array of V-grooves. The unit also includes a variable FAU lid disposed over the array of V-grooves and the plurality of optical channels.

One general aspect includes a fiber array unit (FAU). The fiber array unit includes an FAU substrate with a coupling surface and formed from a first material may include a first coefficient of thermal expansion (CTE). The FAU also includes a variable FAU lid formed from a second material with a second CTE, where the first CTE is lower than the second CTE, an array of V-grooves formed in the FAU substrate. The unit also includes a plurality of optical channels individually disposed in a respective V-groove of the array of V-grooves, where ends of the optical channels are defined along a curve defined in the coupling surface caused by a mismatch in the first CTE and the second CTE.

EXAMPLE EMBODIMENTS

Optical channel/fiber counts including transmission, reception, and laser channels, per PIC or photonic device, continually increase for higher optical bandwidth applications of modern optical components. The increase of the optical channels widens the optical contact area that needs to be maintained flat for higher channel count. As photonic device warp, an alignment between waveguides in PICs and FAU optical channels lose efficiency. For example, coupling efficiency may drop as the PIC curves and a fiber does not align with the waveguide.

Additionally, as photonic devices trend towards more extreme aspect ratios (thinner die and/or larger footprint), the potential warpage of the PIC during assembly/packaging (static) and during operation caused by environmental temperature changes (dynamic) is increased. Additionally, development shifts towards traditional EIC packaging, such as chip-on-(organic) substrate (CoS) largely ignores particular requirements of optical packages such that the warpage and alignment efficiencies may be exacerbated.

The variable FAUs described herein provide for flexible non-linear fiber alignment with photonic devices and include an FAU substrate with a coupling surface, an array of V-grooves formed in a FAU substrate, and a plurality of optical channels individually disposed in a respective V-groove of the array of V-grooves. The array of V-grooves and the optical channels are positioned along a curve or non-linear line defined in the coupling surface such that the optical channels are more aligned with waveguides in a photonic device as described herein.

Figure 1B:
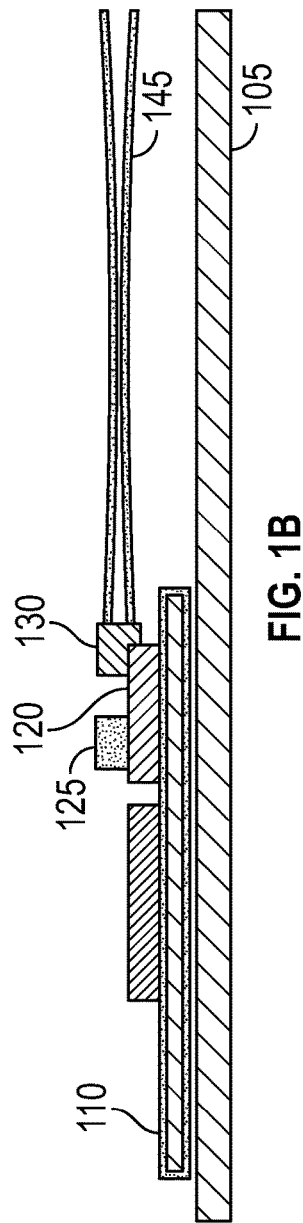

FIGS. 1A and 1B provide views of a network device 102 with multiple photonic devices 120a-120d, according to one or more embodiments. More specifically, diagram 100 of FIG. 1A provides a top view of the network device 102 (showing photonic devices 120a-120d), and diagram 160 of FIG. 1B provides a side view of the network device 102 (showing the PIC 120 and variable FAU 130). The features illustrated in diagrams 100 and 160 may be used in conjunction with other embodiments described herein.

In the diagrams 100 and 160, the network device 102 includes a host PCB 105, and a substrate 110 arranged on the host PCB 105. In some examples, the substrate 110 includes a silicon substrate, although other implementations of the substrate 110 are also contemplated. An application-specific integrated circuit (ASIC) 115 (e.g., a host processor) and a plurality of photonic devices 120a-120d (collectively PIC 120) are arranged on the substrate 110. A respective electronic die 125 is arranged on each photonic device 120a-120d. Each of the ASIC 115, the plurality of photonic devices 120a-120d, and the electronic dies 125 may provide any suitable functionality for processing electrical signals and/or optical signals in CPO applications.

Additionally, each of the photonic devices includes a fiber array unit. For example, a respective variable FAU 130 is arranged on each photonic die 120a-120d. The variable FAUs 130 attach to respective optical fibers 145a-145d (collectively optical fibers 145) and position the optical fibers 145a-145d to optically couple with optical channels, optical waveguides, or other optical components formed in the respective photonic dies 120a-120d. Each of the optical fibers 145a-145d may represent a respective one or more optical fibers, which may include any combination of polarization maintaining fibers (PMFs), single-mode optical fiber(s) (SMFs), and/or multi-core optical fiber(s) (MCFs).

As described above, a mismatch in the CTE of the substrate 110 and the PIC 120 may cause warpage in the PIC 120 and the waveguides/optical channels in the respective photonic devices as shown in FIGS. 2A and 2B.

FIGS. 2A and 2B provide cross-section views of a warped photonic device and FAU, according to one or more embodiments. FIG. 2A includes view 200 which includes the PIC 120 with a warpage caused by CTE mismatch. The PIC 120 includes optical channels such as the waveguides 220. In some examples, the variable FAU 230 is a linear FAU without a curve such that optical fibers 235 are arranged along a straight line in the FAU, where cores 240 of the optical fibers 235 do not efficiently align with the waveguides 220 which causes a drop in efficiency in the coupling between the optical fibers 235 and the waveguides 220.

View 201 of FIG. 2B includes the PIC 120 and a variable FAU 130 where optical fibers 255 in the variable FAU 130 include cores 260 which align with waveguides 220. In some examples, the waveguides are disposed along a non-linear line or a curve 250 in the PIC 120 due to the warpage of the PIC 120. In some examples, the curve 250 is a modeled curve and may be determined such that the variable FAU 130 is fabricated to match the curve 250. The curve 250 and the position of the waveguides 220 along the curve 250 may also be measured directly such that variable FAU 130 may be fabricated according to curve and position of the waveguides. Various configurations of the variable FAU 130 are described in more detail in relation to FIGS. 3-5.

Figure 3:
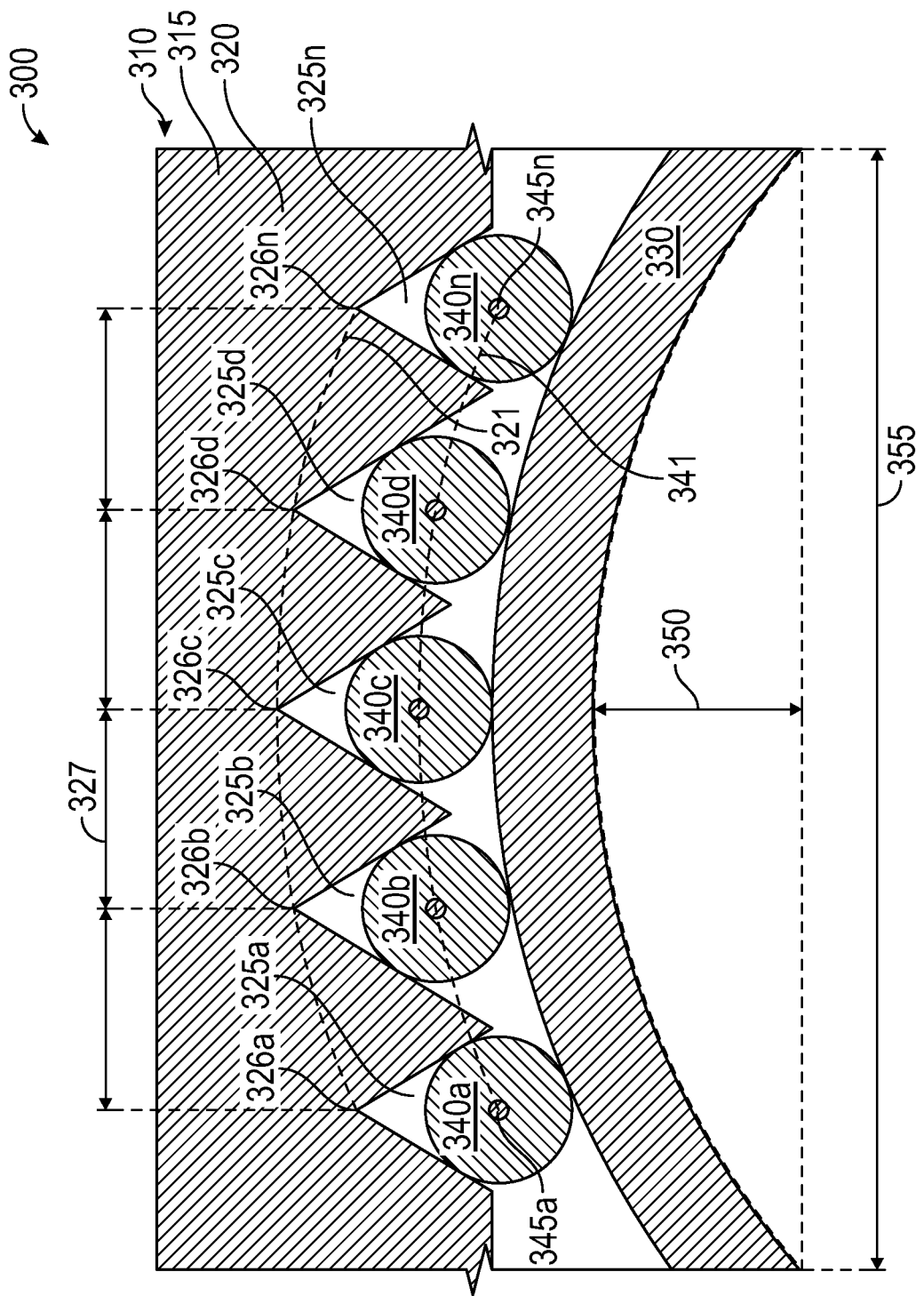
FIG. 3 provides a cross-section view of a variable FAU, according to one embodiment.

FIG. 3 provides a cross-section view 300 of a variable FAU, according to one embodiment. The variable FAU 310 includes a variable FAU substrate 320 with a coupling surface 315. In some examples, the coupling surface 315 is butt-coupled or otherwise edge coupled to a PIC, such as the PIC 120 shown in FIGS. 1A-B and FIG. 2A-B. The variable FAU 310 also includes an array of V-grooves 325 formed in the variable FAU substrate 320, including V-grooves 325a-325n positioned at a pitch 327. In some examples, each of the V-grooves 325a-325n include a respective bottom point 326a-n of the respective V-groove at a varying depth along a curve 321 defined in the coupling surface 315.

The variable FAU 310 also includes a plurality of optical channels, such as optical fibers 340a-n individually disposed in a respective V-groove of the array of V-grooves 325 and a variable FAU lid 330 disposed over the array of V-grooves and the optical fibers 340a-n.

In some examples, the optical fibers 340a-340n include respective cores 345a-345n which are aligned along a curve 341. In some examples, the optical fibers 340a-340n and the cores 345a-345n are optically coupled to a second plurality of optical channels, such as the waveguides 220 in a photonic device such as a photonic integrated circuit (PIC), such as the PIC 120. In some examples, endpoints of the waveguides 220, are defined in a curve in the PIC, such as the curve 250. The curves 321 and 341 are defined in the variable FAU 310 to align cores 345a-345n to the waveguides 220. In some examples, the curves 321 and 341 include a non-linear curve defined by a measured variation in the PIC 120. In another example, the curve 321 and 341 include a non-linear curve defined by a modeled curve for the PIC 120.

In one example model, laminate structures (such as the CoS of the PIC 120 and substrate 110 in FIG. 1), can be considered as composite beam structures subject to a moment, defined by CTE mismatch. For small deflections, such as a deflection 350 over width 355, the Euler beam theory is utilized and PIC warpage along an edge follows in general a cubic function. For the case of very small deflections, such as those experienced in the PIC 120, the defection can be described by the dominant quadratic term. Additionally, and due to lower silicon CTE (e.g., approximately 2 ppm) than underlying substrate PCB (e.g., approximately 5 to 15 ppm), the direction of curvature will in most cases be negative and the curvature will increase over operational temperature range going from highest to lowest temperature. In some examples, once the curve 250 is determined, the curves 341 and 321 may be determined in order to match cores 345a-n to the waveguides in the PIC 120.

The V-grooves 325a-325n and the respective bottom points 326a-n may have varying depths related to surface of the variable FAU substrate 320, in order to provide the curve 341. For example, the bottom point 326c may be at a depth greater than then bottom points 326a and 326n in order to form the curve 321 or otherwise provide an alignment for optical fibers along the curve 341. The V-grooves 325a-325n may be formed using standard V-groove manufacturing processes with an added vertical stepper. For example a fixed dicing blade may be utilized and running back/forth over the variable FAU substrate 320, with a step perpendicular to blade at fixed pitch, such as the pitch 327 in between blade runs to form the array of V-grooves 325 with varying depths.

The variable FAU 310 also includes a variable FAU lid 330 disposed over the array of V-grooves 325 and the optical fibers 340a-340n to position the optical fibers within respective V-grooves with a 3 point contact between the V-groove and the variable FAU lid 330. In some examples, the variable FAU substrate 320 is formed from a first material with a first CTE, and the variable FAU lid 330 is formed from a second material with a second CTE. Is some examples, the first CTE is lower than the second CTE, and a mismatch between the first CTE and the second CTE may also cause the variable FAU to warp and further define the curves 321 and 341 in the coupling surface as described in more detail in relation to FIG. 5.

Figure 4:
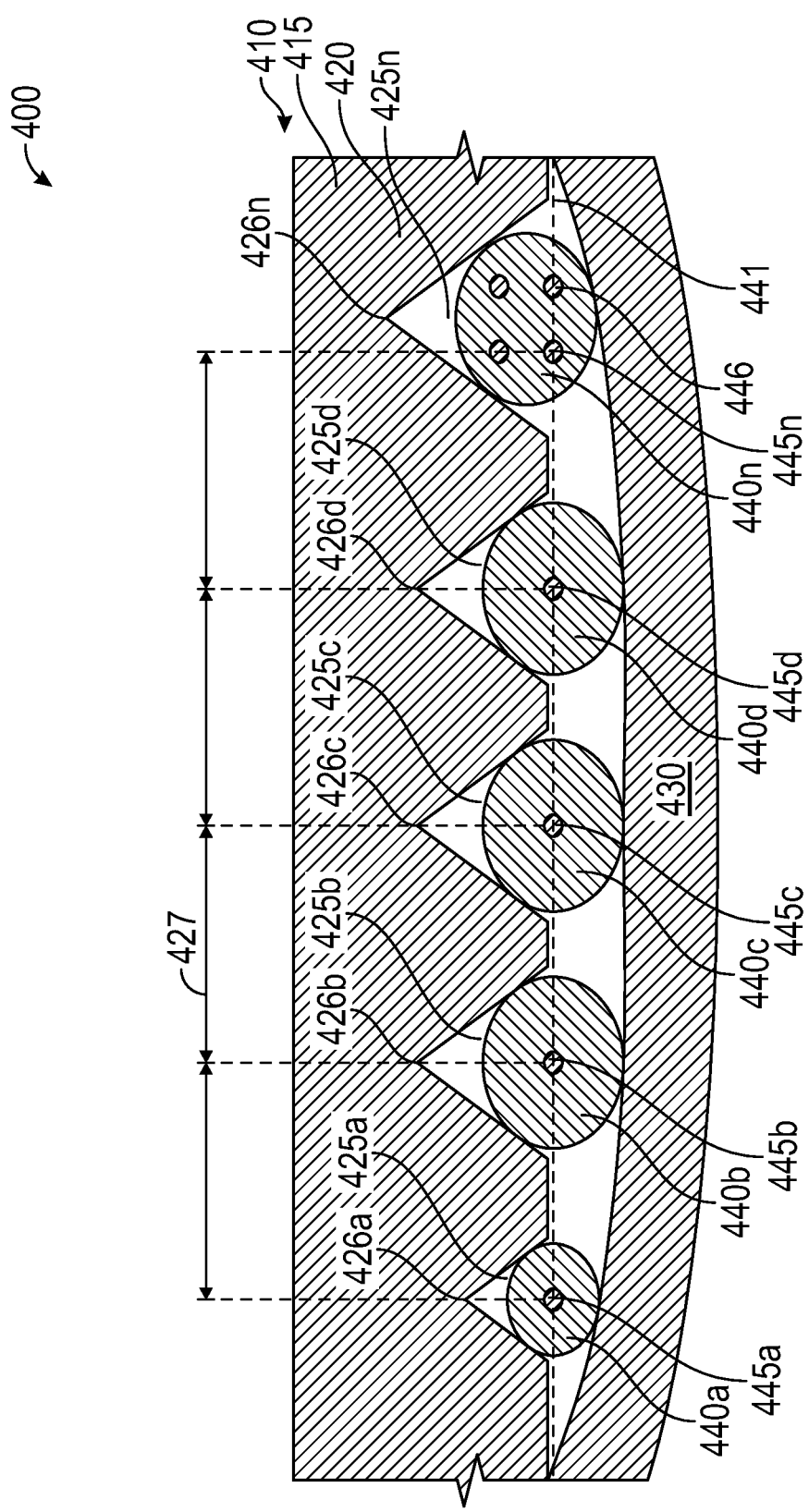
FIG. 4 provides a cross-section view of a variable FAU, according to one embodiment.

FIG. 4 provides a cross-section view 400 of a variable FAU 410, according to one embodiment. The variable FAU 410 includes a variable FAU substrate 420 with a coupling surface 415. In some examples, the coupling surface 415 is butt-coupled or otherwise edge coupled to a PIC, such as the PIC 120 shown FIGS. 1A-B and FIG. 2A-B. The variable FAU 410 also includes an array of V-grooves 425 formed in the variable FAU substrate 420, including V-grooves 425a-425n positioned at a pitch 427. In some examples, the pitch 427 is non-uniform between each of the respective V-grooves 425a-425n. In some examples, each of the V-grooves 425a-425n include a respective bottom point, such as the bottom points 426a-426n, similar to the bottom points described in FIG. 3. In some examples, the V-grooves 425a-425n include different widths in order to position different types of fibers along a line 441. The line 441 may include non-linear lines such as the curve 341 in FIG. 3. In another example, the line 441 may be a linear or near linear line, where variations in the size of the various optical fibers 440a-n may cause misalignment when not utilizing a variable FAU as described herein.

For example, the variable FAU 410 also includes a plurality of optical channels, such as optical fibers 440a-n individually disposed in a respective V-groove of the array of V-grooves 425 and a variable FAU lid 430 disposed over the array of V-grooves and the optical fibers 440a-n.

In some examples, the optical fibers 440a-440n include respective cores 445a-445n which are aligned along the line 441. In some examples, the optical fibers 440a-440n and the cores 445a-445n are optically coupled to a second plurality of optical channels, such as the waveguides 220 in the PIC 120. In some examples, endpoints of the waveguides 220, are defined in a curve in the PIC, such as the curve 250. In another example, the endpoints of the waveguides 220 may be defined along a linear or near linear line in the PIC. The line 441 is defined in the variable FAU 410 to align cores 445a-445n to the waveguides 220 while accounting for variation in the number of cores and the outer diameter of the various connected fibers.

In some examples, the fibers 440 may include a subset of fibers that are MCFs. For example, the fiber 440n is an MCF with cores 445n and 446. The cores 446 may positioned to also couple to additional waveguides in the PIC 120. Additionally, the fibers 445 may have differing outer diameters. For example, the outer diameter of the fiber 445a is smaller than the outer diameter of the fibers 445b-445d. In some examples, the widths and associated depths of the V-grooves are based on the outer diameter of the fiber in the V-groove and to position a respective core along the line 441.

The variable FAU 410 also includes a variable FAU lid 430 disposed over the array of V-grooves 425 and the optical fibers 440a-440n to position the optical fibers within respective V-grooves with a 3 point contact between the V-groove and the variable FAU lid 430.

Figure 5:
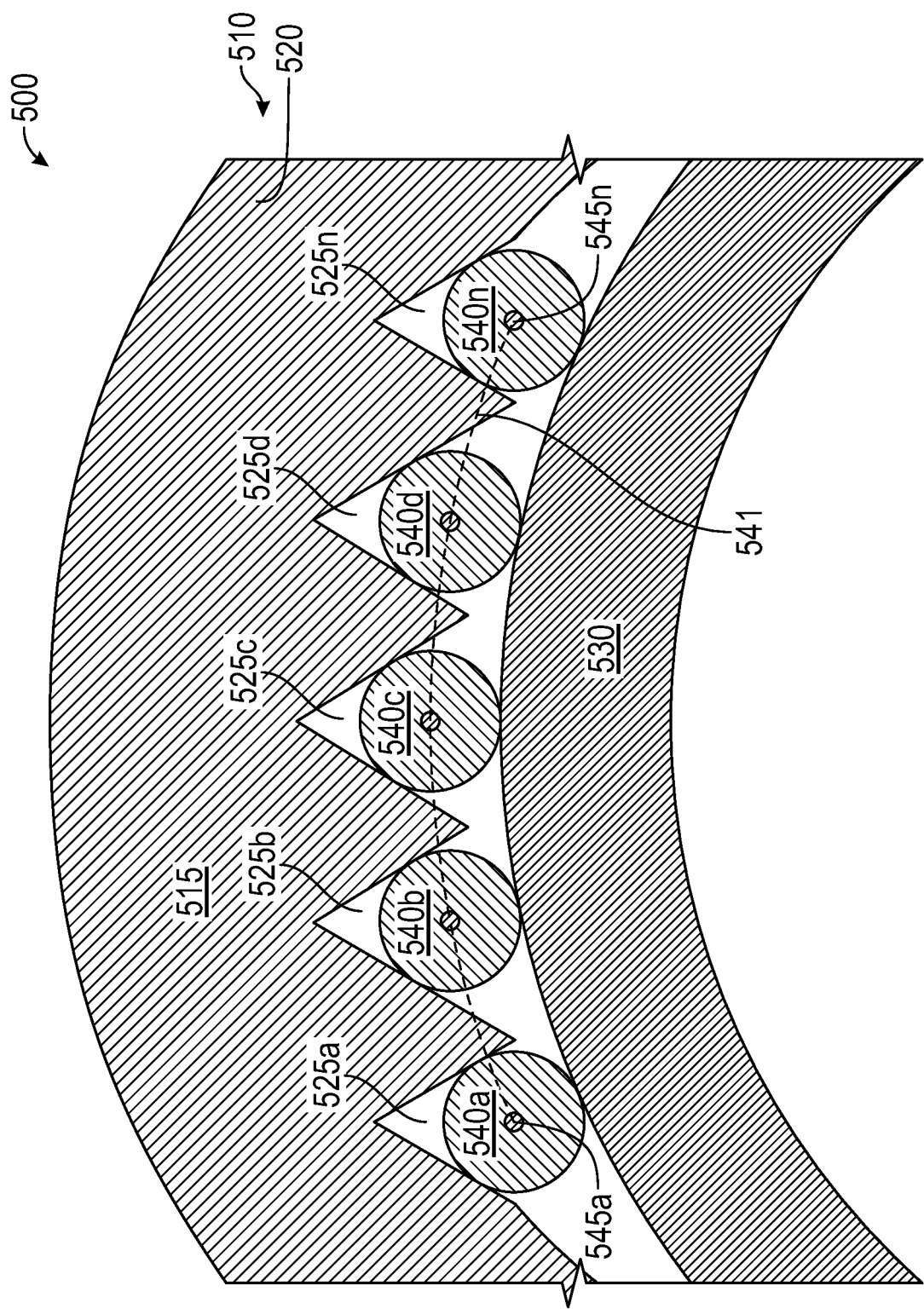
FIG. 5 provides a cross-section view of a variable FAU, according to one embodiment.

FIG. 5 provides a cross-section view 500 of a warped photonic device and variable FAU 510, according to one embodiment. The variable FAU 510 includes a variable FAU substrate 520 with a coupling surface 515. In some examples, the coupling surface 515 is butt-coupled or otherwise edge coupled to a PIC, such as the PIC 120 shown FIGS. 1A-B and FIG. 2A-B. The variable FAU 510 also includes an array of V-grooves 525 formed in the variable FAU substrate 520, including V-grooves 525a-525n. In some examples, each of the V-grooves 525a-525n include varying depths and widths as described in relation to FIGS. 3 and 4.

The variable FAU 510 also includes a plurality of optical channels, such as optical fibers 540a-540n individually disposed in a respective V-groove of the array of V-grooves 525 and a variable FAU lid 530 disposed over the array of V-grooves and the optical fibers 540a-n. In some examples, the variable FAU substrate 520 is formed from a first material with a first CTE, and the variable FAU lid 530 is formed from a second material with a second CTE. Is some examples, the first CTE is lower than the second CTE, and a mismatch between the first CTE and the second CTE causes the variable FAU to warp and define a line 441 in the coupling surface 515 as the temperature of the variable FAU 510 fluctuates. In some examples, the line 441 matches the corresponding curve of warpages in the PIC 120.

In some examples, the optical fibers 540a-540n include respective cores 545a-545n which are aligned along the curve 541. In some examples, the optical fibers 540a-540n and the cores 545a-545n are optically coupled to a second plurality of optical channels, such as the waveguides 220 in a photonic integrated circuit (PIC), such as the PIC 120. In some examples, endpoints of the waveguides 220, are defined in a curve in the PIC is caused by warpage due to CTE mismatch, where the curve 541 defined in the variable FAU 510 to align cores 545a-545n to the waveguides 220. In some examples, the size and depth of the materials of the variable FAU substrate 520 and the variable FAU lid 530 are adjusted in order to match the curve 541.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A fiber array unit (FAU) comprising:
   an FAU substrate comprising a coupling surface, wherein the FAU substrate is formed from a first material comprising a first coefficient of thermal expansion (CTE);
   an array of V-grooves formed in the FAU substrate, where each V-groove in the array of V-grooves comprises:
   a bottom point of the V-groove at a varying depth;
   a plurality of optical channels individually disposed in a respective V-groove of the array of V-grooves to align along a curve defined in the coupling surface; and
   a variable FAU lid disposed over the array of V-grooves and the plurality of optical channels, wherein the variable FAU lid is formed from a second material comprising a second CTE, wherein the first CTE is lower than the second CTE, and wherein a mismatch between the first CTE and the second CTE causes the FAU to warp and define the curve in the coupling surface.

2. The FAU of claim 1, wherein the plurality of optical channels are optically coupled to a second plurality of optical channels in a photonic integrated circuit (PIC), wherein endpoints of the second plurality of optical channels are defined along a curve in the PIC, wherein the curve in the PIC is caused by warpage due to coefficient of thermal expansion (CTE) mismatch.

3. The FAU of claim 1, wherein the curve comprises a non-linear curve defined by a measured variation in a photonic integrated circuit (PIC), wherein the plurality of optical channels are butt-coupled to the PIC at the coupling surface.

4. The FAU of claim 1, wherein the curve comprises a non-linear curve defined by a modeled curve for a photonic integrated circuit (PIC), wherein the plurality of optical channels are butt-coupled to the PIC at the coupling surface.

5. The FAU of claim 1, wherein the plurality of optical channels comprises optical fibers.

6. The FAU of claim 5, wherein the variable FAU lid is disposed over the array of V-grooves and the plurality of optical channels to position the optical fibers within respective V-grooves with a 3 point contact between the V-groove and the variable FAU lid.

7. A fiber array unit (FAU) comprising:
   an FAU substrate comprising a coupling surface;
   an array of V-grooves formed in the FAU substrate, where each V-groove in the array of V-grooves comprises:
   a varying V-groove width;
   a bottom point of the V-groove at a varying depth along a line defined in the coupling surface;
   a plurality of optical channels individually disposed in a respective V-groove of the array of V-grooves; and
   a variable FAU lid disposed over the array of V-grooves and the plurality of optical channels, wherein the variable FAU lid is curved to contact the plurality of optical channels.

8. The FAU of claim 7, wherein the plurality of optical channels are optically coupled to a second plurality of optical channels in a photonic integrated circuit (PIC), wherein endpoints of the second plurality of optical channels are defined along a line in the PIC, wherein the line in the PIC is caused by warpage due to coefficient of thermal expansion (CTE) mismatch.

9. The FAU of claim 7, wherein the line comprises a non-linear curve defined by a measured variation in a photonic integrated circuit (PIC) or modeled curve for the PIC, wherein the plurality of optical channels are butt-coupled to the PIC at the coupling surface.

10. The FAU of claim 7, wherein the plurality of optical channels comprises optical fibers.

11. The FAU of claim 10, wherein the optical fibers include a combination of varying optical fibers including one or more of:
an optical fiber with a first outer diameter,
an optical fiber with a second outer diameter different than the first outer diameter, and
a multi-core optical fiber.

12. The FAU of claim 11, wherein the variable FAU lid is disposed over the array of V-grooves and the plurality of optical channels to position the optical fibers within respective V-grooves with a 3 point contact between the V-groove and the variable FAU lid.

13. The FAU of claim 11, wherein the optical fibers comprise one or more of:
a first subset of optical fibers comprising multi-core optical fibers;
a second subset of optical fibers comprising single-mode optical fibers comprising a first outer diameter; and
a third subset of optical fibers comprising single-mode optical fibers comprising a second outer diameter.

14. A fiber array unit (FAU) comprising:
an FAU substrate comprising a coupling surface and formed from a first material comprising a first coefficient of thermal expansion (CTE);
a variable FAU lid formed from a second material comprising a second CTE, where the first CTE is lower than the second CTE,
an array of V-grooves formed in the FAU substrate; and
a plurality of optical channels individually disposed in a respective V-groove of the array of V-grooves, where ends of the optical channels are defined along a curve defined in the coupling surface caused by a mismatch in the first CTE and the second CTE.

15. The FAU of claim 14, wherein the plurality of optical channels are optically coupled to a second plurality of optical channels in a photonic integrated circuit (PIC), wherein endpoints of the second plurality of optical channels are defined along a curve in the PIC, wherein the curve in the PIC is caused by warpage due to CTE mismatch in the PIC.

16. The FAU of claim 14, wherein the curve comprises a non-linear curve defined by a measured variation in a photonic integrated circuit (PIC), wherein the plurality of optical channels are butt-coupled to the PIC at the coupling surface.

17. The FAU of claim 14, wherein the curve comprises a non-linear curve defined by a modeled curve for a photonic integrated circuit (PIC), wherein the plurality of optical channels are butt-coupled to the PIC at the coupling surface.

18. The FAU of claim 14, wherein the plurality of optical channels comprises optical fibers.

19. The FAU of claim 18, wherein the variable FAU lid is disposed over the array of V-grooves and the plurality of optical channels to position the optical fibers within respective V-grooves with a 3 point contact between the V-groove and the variable FAU lid.

* * * * *